US008901451B2

(12) United States Patent
Leiteritz et al.

(10) Patent No.: US 8,901,451 B2
(45) Date of Patent: Dec. 2, 2014

(54) PLASMA TORCH AND MOVEABLE ELECTRODE

(75) Inventors: Nathan Gerald Leiteritz, Little Chute, WI (US); George Arthur Crowe, Claremont, NH (US); Tomas Kusak, Uherske Hradiste (CZ); Zdenek Lapcik, Velehrad (CZ)

(73) Assignee: Illinois Tool Works Inc., Glenview, IL (US)

( * ) Notice: Subject to any disclaimer, the term of this patent is extended or adjusted under 35 U.S.C. 154(b) by 627 days.

(21) Appl. No.: 13/213,980

(22) Filed: Aug. 19, 2011

(65) Prior Publication Data

US 2013/0043224 A1 Feb. 21, 2013

(51) Int. Cl.
*B23K 10/00* (2006.01)
*H05H 1/34* (2006.01)

(52) U.S. Cl.
CPC ......... *H05H 1/34* (2013.01); *H05H 2001/3489* (2013.01)
USPC .............. 219/121.52; 219/121.5; 219/121.48; 315/111.21

(58) Field of Classification Search
CPC ... H05H 1/34; H05H 2001/3478; H05H 1/38; H05H 1/26; H05H 1/32
USPC ......... 219/121.52, 121.39, 121.48, 121.5, 75, 219/119; 315/111.21
See application file for complete search history.

(56) References Cited

U.S. PATENT DOCUMENTS

| | | | |
|---|---|---|---|
| 4,225,769 | A | 9/1980 | Wilkins |
| 4,558,201 | A | 12/1985 | Hatch |
| 4,701,590 | A | 10/1987 | Hatch |
| 4,748,312 | A | 5/1988 | Hatch et al. |
| 4,782,210 | A | 11/1988 | Nelson et al. |
| 4,791,268 | A | 12/1988 | Sanders et al. |
| 5,017,752 | A | 5/1991 | Severance, Jr. et al. |
| 5,023,425 | A | 6/1991 | Severance, Jr. |
| 5,097,111 | A | 3/1992 | Severance, Jr. |
| 5,105,061 | A | 4/1992 | Blankenship |
| 5,164,569 | A | 11/1992 | Porra et al. |
| 5,170,033 | A | 12/1992 | Couch, Jr. et al. |
| 5,208,441 | A | 5/1993 | Broberg |
| 5,310,988 | A | 5/1994 | Couch, Jr. et al. |
| 5,451,739 | A | 9/1995 | Nemchinsky et al. |
| 5,464,962 | A | 11/1995 | Luo et al. |

(Continued)

FOREIGN PATENT DOCUMENTS

| | | |
|---|---|---|
| JP | 9192844 | 7/1997 |
| WO | 2007129194 A2 | 11/2007 |
| WO | 2008101226 A1 | 8/2008 |

OTHER PUBLICATIONS

International Search Report from PCT application No. PCT/US2012/051269 dated Jan. 7, 2013, 11 pgs.

*Primary Examiner* — Mark Paschall
(74) *Attorney, Agent, or Firm* — Fletcher Yoder P.C.

(57) ABSTRACT

A plasma torch is provided having an electrode with a frustoconical end portion. The electrode is received by a plunger during a contact start sequence of the plasma torch and is self-releasing from the torch. The electrode may include a shoulder portion that provides concentric alignment and centering of the electrode with respect to the central longitudinal axis of the components. Other components of the torch include a nozzle, a swirl ring, and retaining cup, such that the consumables of the torch may be toollessly removed and installed.

26 Claims, 9 Drawing Sheets

(56) References Cited

U.S. PATENT DOCUMENTS

| | | | | |
|---|---|---|---|---|
| 5,601,734 | A | 2/1997 | Luo et al. | |
| 5,893,985 | A | 4/1999 | Luo et al. | |
| 5,951,888 | A | 9/1999 | Oakley | |
| 5,965,045 | A | 10/1999 | Zigliotto | |
| 6,066,827 | A | 5/2000 | Nemchinsky | |
| 6,114,650 | A | 9/2000 | Marner et al. | |
| 6,130,399 | A | 10/2000 | Lu et al. | |
| 6,191,381 | B1 | 2/2001 | Kabir | |
| 6,207,923 | B1 | 3/2001 | Lindsay | |
| 6,215,090 | B1 | 4/2001 | Severance, Jr. et al. | |
| 6,403,915 | B1 | 6/2002 | Cook et al. | |
| 6,424,082 | B1 | 7/2002 | Hackett et al. | |
| 6,452,130 | B1 | 9/2002 | Qian et al. | |
| 6,472,631 | B1 | 10/2002 | Eickhoff et al. | |
| 6,563,075 | B1 | 5/2003 | Severance, Jr. et al. | |
| 6,614,001 | B2 | 9/2003 | Hackett et al. | |
| 6,841,754 | B2 | 1/2005 | Cook et al. | |
| 6,852,943 | B2 | 2/2005 | Eickhoff et al. | |
| 6,998,566 | B2 | 2/2006 | Conway et al. | |
| 7,005,600 | B2 | 2/2006 | Conway et al. | |
| 7,105,770 | B2 | 9/2006 | Griffin et al. | |
| 7,132,619 | B2 | 11/2006 | Conway et al. | |
| 7,423,235 | B2 | 9/2008 | Severance, Jr. | |
| 7,762,830 | B2 | 7/2010 | Roberts | |
| 8,115,136 | B2 * | 2/2012 | Mather et al. ............ | 219/121.57 |
| 2002/0135283 | A1 * | 9/2002 | Hackett et al. ........... | 313/231.41 |
| 2004/0173582 | A1 * | 9/2004 | Homer-Richardson et al. ........................ | 219/121.51 |
| 2004/0232118 | A1 * | 11/2004 | Horner-Richardson et al. ........................ | 219/121.48 |
| 2005/0258150 | A1 * | 11/2005 | Hewett et al. ............ | 219/121.48 |
| 2012/0199563 | A1 * | 8/2012 | Hebert et al. ............ | 219/121.48 |

* cited by examiner

FIG. 9
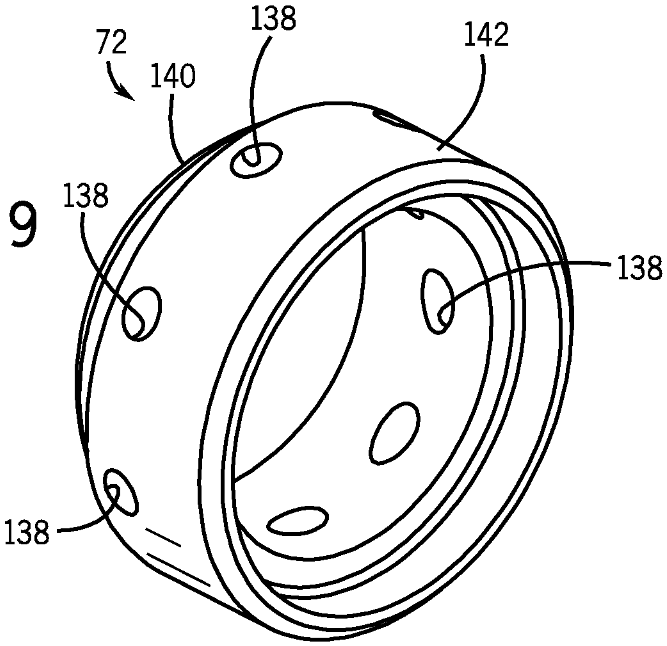
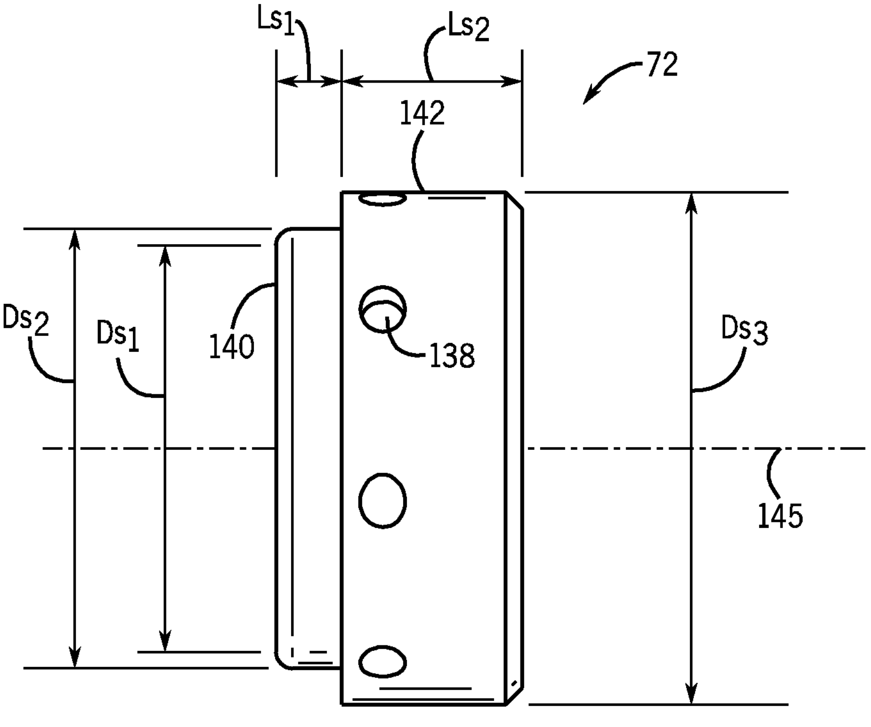
FIG. 10

PLASMA TORCH AND MOVEABLE ELECTRODE

BACKGROUND

The invention relates generally to plasma cutting systems and, more particularly, to a plasma torch for such systems.

BRIEF DESCRIPTION

A plasma cutting system creates plasma (from high temperature ionized gas) to cut metal or other electrically conductive material. In general, an electrical arc converts a gas (e.g., compressed air) into plasma, which is sufficiently hot to melt the work piece while the pressure of the gas blows away the molten metal. The electrical arc is initiated in a plasma torch, and gas flows through the torch. The design of the torch may control a number of variables that affect the usability and performance of the plasma cutting system.

DRAWINGS

These and other features, aspects, and advantages of the present invention will become better understood when the following detailed description is read with reference to the accompanying drawings in which like characters represent like parts throughout the drawings, wherein:

FIG. 9 is a perspective view of a swirl ring of a plasma torch in accordance with an embodiment of the present invention;

FIG. 10 is a side view of the swirl ring of FIG. 9 in accordance with an embodiment of the present invention;

DETAILED DESCRIPTION

Figure 1:
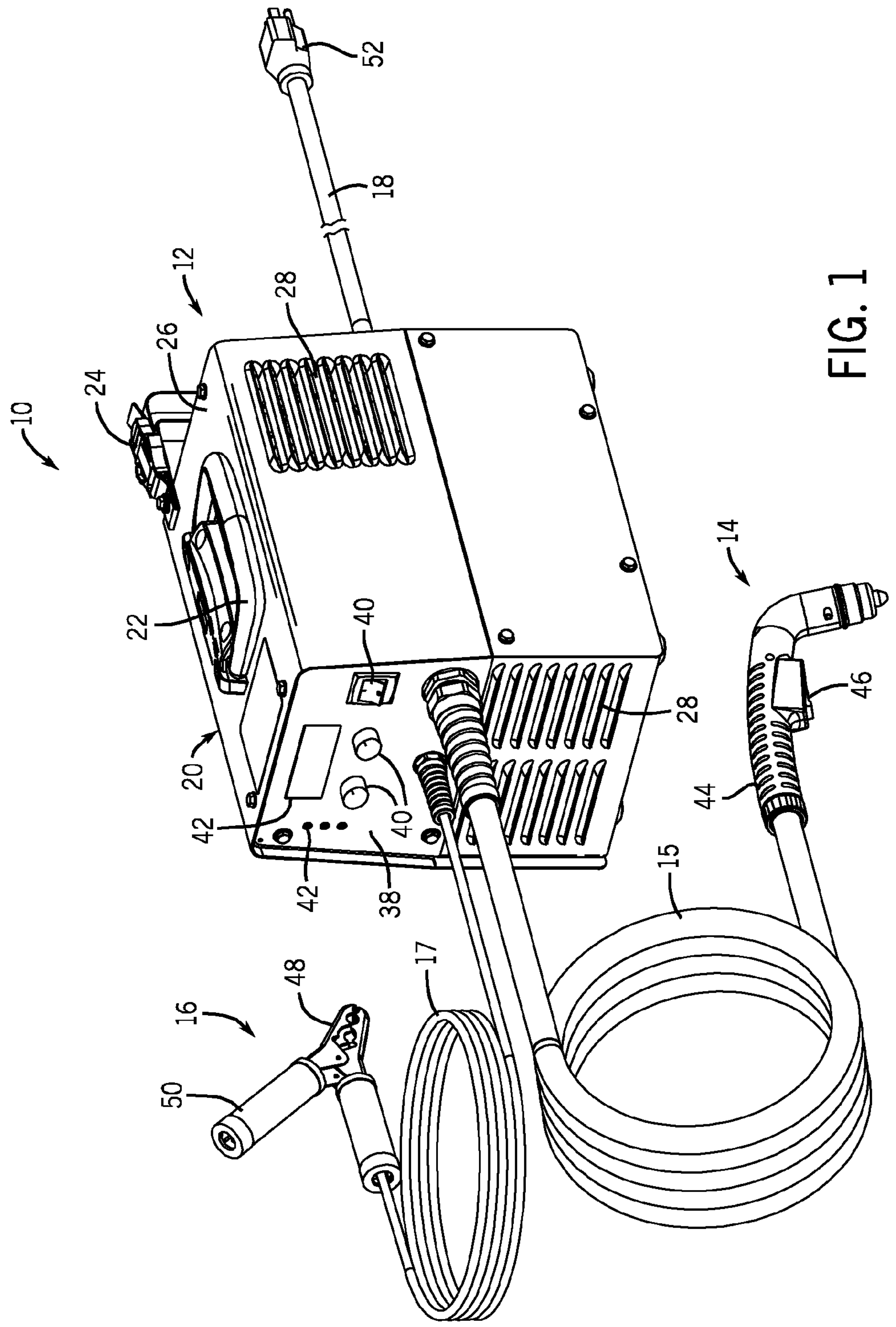
FIG. 1 is a perspective view of a plasma cutting system in accordance with embodiments of the present invention.

Referring now to the drawings, FIG. 1 is a perspective view illustrating an embodiment of a portable plasma cutting system 10. The illustrated plasma cutting system 10 includes a torch power unit 12 coupled to a plasma torch 14 and a work piece clamp 16 via a torch cable 15 and a work piece cable 17, respectively. As described further below in FIGS. 2-12, the plasma torch 14 may include various features that provide improved performance and durability, easier assembly and replacement of components of the torch 14, and longer usage life. The torch power unit 12 may be coupled to a power source (e.g., a power grid or a motor-driven generator) via a power cable 18. As described further below, the power source may provide a current to the torch 14 for starting and generating a pilot arc, and for maintaining plasma and a cutting arc. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12.

The power unit 12 includes an enclosure 20 defining a generally closed volume to support various circuits, sensor features, control features, and gas supply features (e.g., air compressor). For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power 18. The enclosure 20 may also include vents 28 to relieve heat and/or pressure inside the system 10. Additional vents may be located on other panels of the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, gouge, etc.), power on/off, an output current level, gas (e.g., air) flow rate, gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, voltage, gas flow rate, gas pressure, or other operational parameters, or a combination thereof.

The plasma torch 14 includes a handle 44 and a locking trigger 46, as well as various other components described below in FIGS. 2-12. The clamp 16 comprises an electrically conductive material clamping portion 48 having insulated handles 50. The power cable 18 includes a plug 52 for connection to a power source such as a wall socket or a motor-driven generator. The plug 52 may be configured to work with a variety of sockets or outlets, and the system 10 may receive different power sources, such as AC 50/60 Hz, 400 Hz, single or three phase 120V, 230V, 400V, 460V, 575V, etc., or any voltage in-between, and +20% of max voltage and −20% of min voltage.

Figure 2:
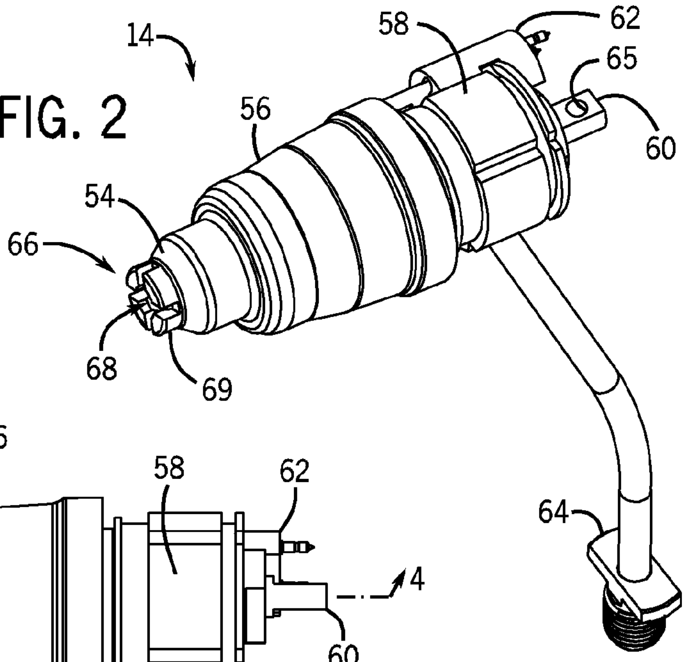
FIG. 2 is a perspective view of a plasma torch in accordance with an embodiment of the present invention.
Figure 3:
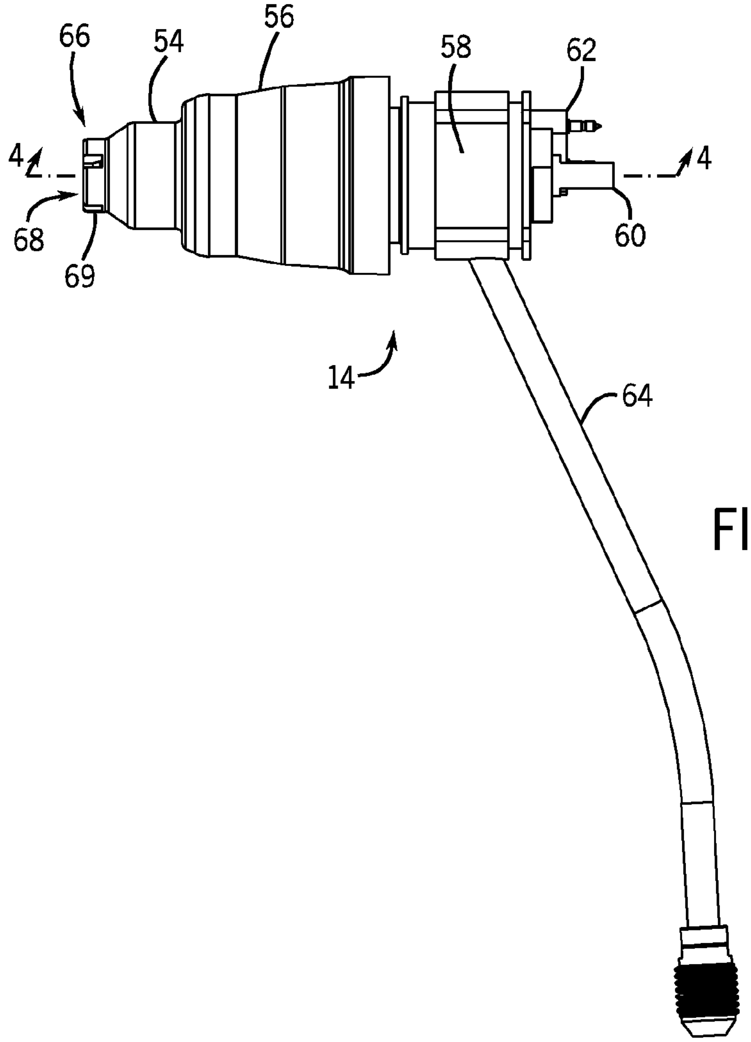
FIG. 3 is a side view of the plasma torch of FIG. 3 in accordance with an embodiment of the present invention.

As described further below, the plasma torch 14 includes various features that provide for contact starting, increased life, and toolless (i.e., without the use of tools) replacement of the components. Turning now to the torch 14 in further detail, FIGS. 2 and 3 depict perspective and side views of the torch 14 respectively, in accordance with an embodiment of the present invention. As shown in FIGS. 2 and 3, the torch 14 may include a drag shield 54, a retaining cup 56, a torch body 58, and a plunger 60. As further depicted, the torch 14 may also include an electrical switch 62 and a gas connector 64. The switch 62 may include pins for electrical control/signal connections and may be used to detect the presence of the retaining cap 56. The plunger 60 may include a hole 65 provides for an electrical power connection to the torch 14.

The drag shield 54 may be formed from copper or other suitable metallic materials or non-metallic, non-conductive materials such as plastic. The retaining cup 56 may be formed from a metallic material and a plastic, such as brass and thermoset plastics (e.g. Bakelite® or the like) or fiberglass reinforced silicone (e.g. G7) or epoxy fiberglass tubing (such as that manufactured by I.D.S.I. Products of Savannah, Ga.). The torch body 58 may be formed from brass or other suitable metallic materials. As explained below, the drag shield 54 may be removably coupled to the retaining cup 56, and the drag shield 54 may be removed or installed without the use of tools. Additionally, the torch 14 and the drag shield 54 may include an exit portion 66 with an orifice 68 through which shielding and/or cooling gas flows out of the exit portion 66. The drag shield 54 may include various features, such as protrusions 70, to enable the drag shield 54 to be elevated from the workpiece and dragged across the work piece during cutting. In some embodiments, the electrical connection 65 and the gas connection 64 may connected to and/or enclosed in the torch cable 15, and in turn connected to the power unit 12.

Figure 4:
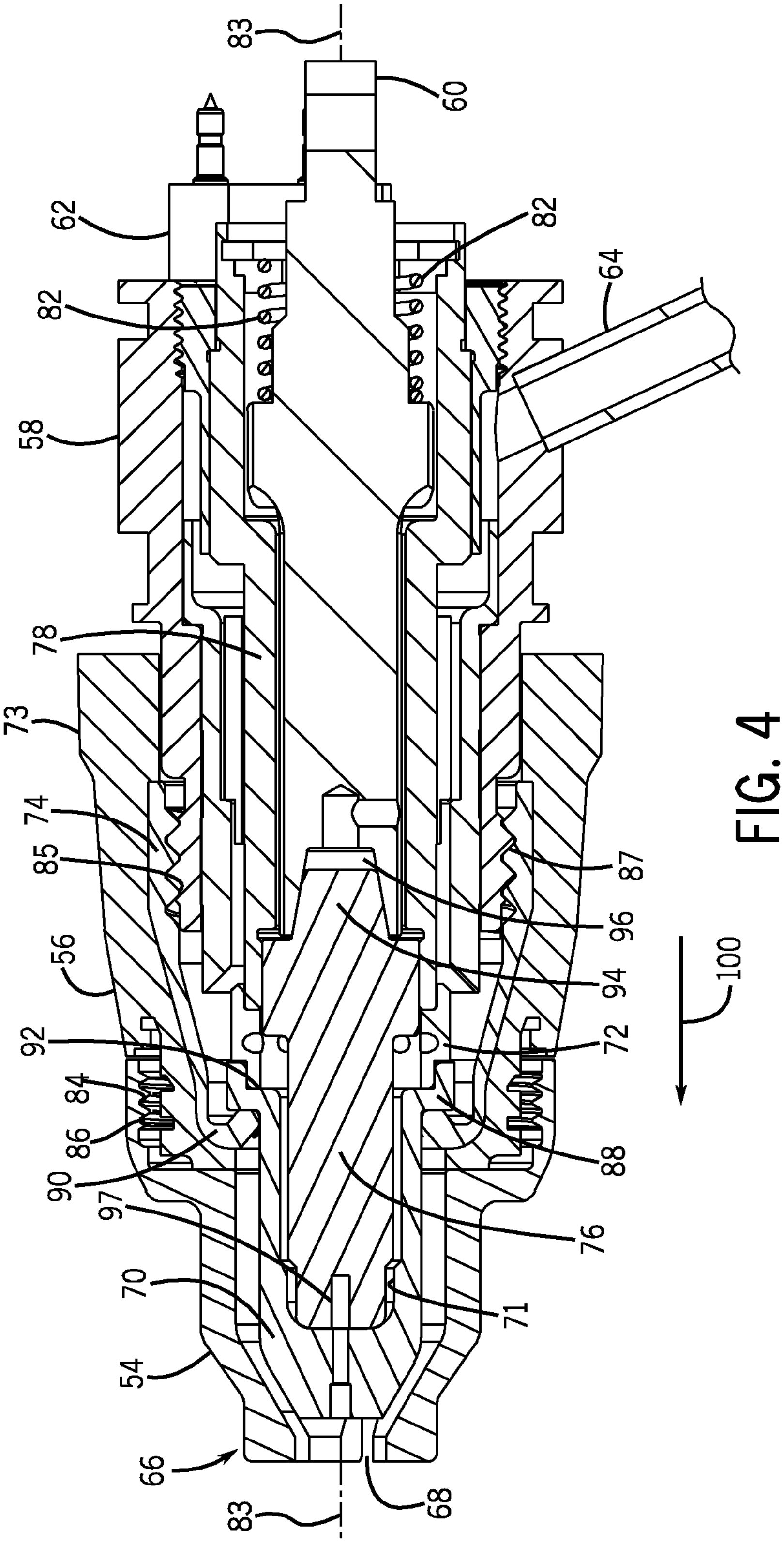
FIGS. 4 and 5 are cross-sections taken along line 4-4 of FIG. 3 in accordance with an embodiment of the present invention.

FIG. 4 depicts a cross-section of the torch 14 taken along line 4-4 of FIG. 3 in accordance with an embodiment of the present invention. As mentioned above, the torch 14 includes the drag shield 54, the retaining cup 56, the torch body 58, the plunger 60, the switch 62, and the gas connector 64. As noted above, the drag shield 54 includes an orifice 68 located at the exit portion 66 of the drag shield 54. Additionally, various internal components of the torch 14 are shown in FIG. 4. The torch 14 may also include a nozzle 70 having an inner surface 71, a swirl ring 72, an electrode 76, a cathode body 78, and a spring 82. Additionally, the retaining cup 56 includes an outer cup member 73 and an inner cup member 74. In some embodiments, the outer cup member 73 may be formed from plastic and the inner cup member 74 may be formed from a metallic material, such as brass. Additionally, the various components of the torch 14 may be concentrically aligned and centered with respect to a longitudinal axis 83 of the torch 14.

Together, the drag shield 54, the nozzle 70, the swirl ring 72, and the electrode 76 may be referred to as "consumables." Some or all of these consumables may wear, i.e., be consumed, during operation of the torch 14, and an operator may replace these worn consumables during the lifetime of the torch 14. Accordingly, the plasma torch 14 provides for toolless replacement, e.g., removal and installation without tools, of the consumables. For example, as shown in FIG. 4, the drag shield 54 may include interior threads 84 for coupling to exterior threads 86 of the retaining cup 56. Similarly, the inner cup member 74 includes interior threads 85 for coupling to exterior threads 87 of the torch body 58. Thus, the drag shield 56 may be removed and installed through the disengagement and engagement of the threads 84 and 86 and the threads 85 and 87.

As shown in FIG. 4, the nozzle 70 may include a shoulder end portion 88, and the inner cup member 74 includes an inner facing lip 90. Thus, the nozzle 70 may be retained by engagement of the inner facing lip 90 with the shoulder end portion 88. The swirl ring 72 may then be captured between an inner surface 92 of the shoulder end portion 88 of the nozzle 70 and the cathode body 78. Finally, as described further below the electrode 76 may include a frustoconical portion 94 and the plunger 60 may include a frustoconical-shaped recess 96. Thus, the electrode 76 may be partially or fully received by the frustoconical portion 94 in the recess 96. Additionally, the electrode 76 may include an emissive insert 97, such as a hafnium insert.

Based on the features described above, each consumable of the plasma torch 14 may be toollessly removed. For example, by removing the drag shield 54 from engagement with the retaining cup 56, and removing the inner cup member 74 from engagement with the torch body 58, the nozzle 70 may be removed from the torch 14. After removal of the nozzle 70, the electrode 76 may be removed from the torch 14. As described below, the frustoconical portion 94 forms a self-releasing angle (e.g. such as approximately 10 to 179 degrees of included angle) contact with the recess 96 of the plunger 60, such that the electrode 76 is self-releasing from the torch 14.

Figure 5:
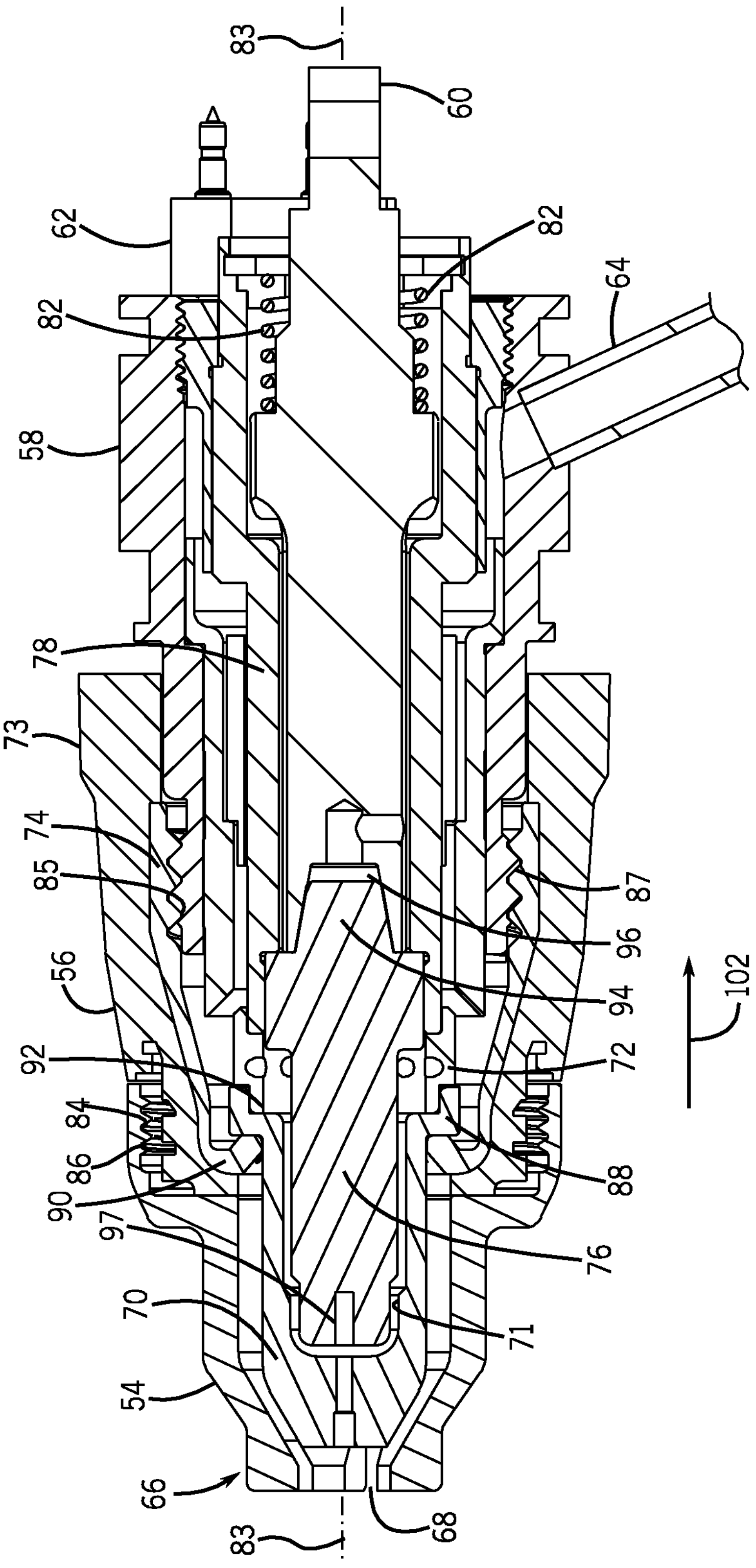

Starting of the torch 14 will be described with reference to FIGS. 4 and 5. FIG. 5 depicts another cross-section of the torch 14 with the electrode 76 fully engaged with the inner cathode member 80 during operation of the torch 14, e.g., after starting the torch and establishing a pilot arc. Embodiments of the torch 14 includes a "contact starting" mechanism such that the electrode 76 (i.e., the cathode) and the nozzle 70 (i.e., the anode) are in contact with one another during starting of the torch 14. Advantageously, such a contact starting mechanism does not require high frequency (HF) and high voltage (HV) power to start the pilot arc.

Before starting, the spring 82 may bias the electrode 76 in the direction indicated by arrow 100, toward the exit portion 66 of the torch 14, such that the electrode 76 is in contact with the nozzle 70. The power source 12 may provide a pilot current to cathodic elements, such as the electrode 76, the plunger 60, and the cathode body 78. However, in alternate embodiments the cathode body 78 may be electrically isolated from the other cathodic elements as well as from the anodic elements such as nozzle 70, inner cup member 74, and torch body 58. Additionally, the pilot current is conducted to the anode, such as the nozzle 70. After electrical current begins to flow from the electrode 76 (cathode) to the nozzle 70 (anode) of the torch 14, pressurized gas, such as air or nitrogen, supplied to the torch 14 counteracts the spring force and moves the electrode 76 away from the nozzle 70, in the direction indicated by arrow 102 shown in FIG. 5. This breaks the physical contact between the electrode 76 and the nozzle 70 and creates the pilot arc.

As the electrode 76 moves away from the nozzle 70, it opens a nozzle orifice and a plasma jet is created outward through the orifice of the nozzle 70 and the orifice 68 of the drag shield 54. When in relative proximity to the work piece the plasma jet causes the arc to transfer (at least in part) to the work piece held by the clamp 16, thus initiating cutting. As shown in FIG. 5, the electrode 76 remains biased in the direction indicated by arrow 102 by the gas and plasma pressure at the exit portion 66 of the torch 14, such that the frustoconical portion 94 of the electrode 76 is received in the recess 96 and the electrode 76 maintains an electrical and thermal connection. The electronics in the power source sense when the arc has transferred and then supply a main cutting current of greater amperage after the transfer has occurred. The nozzle 70 of the torch 14 is disconnected (electrically), interrupting the pilot current path. Thus, the current is used to cut the work piece, and follows a path including the positive terminal, the work piece and the electrode 76. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12.

Figure 6:
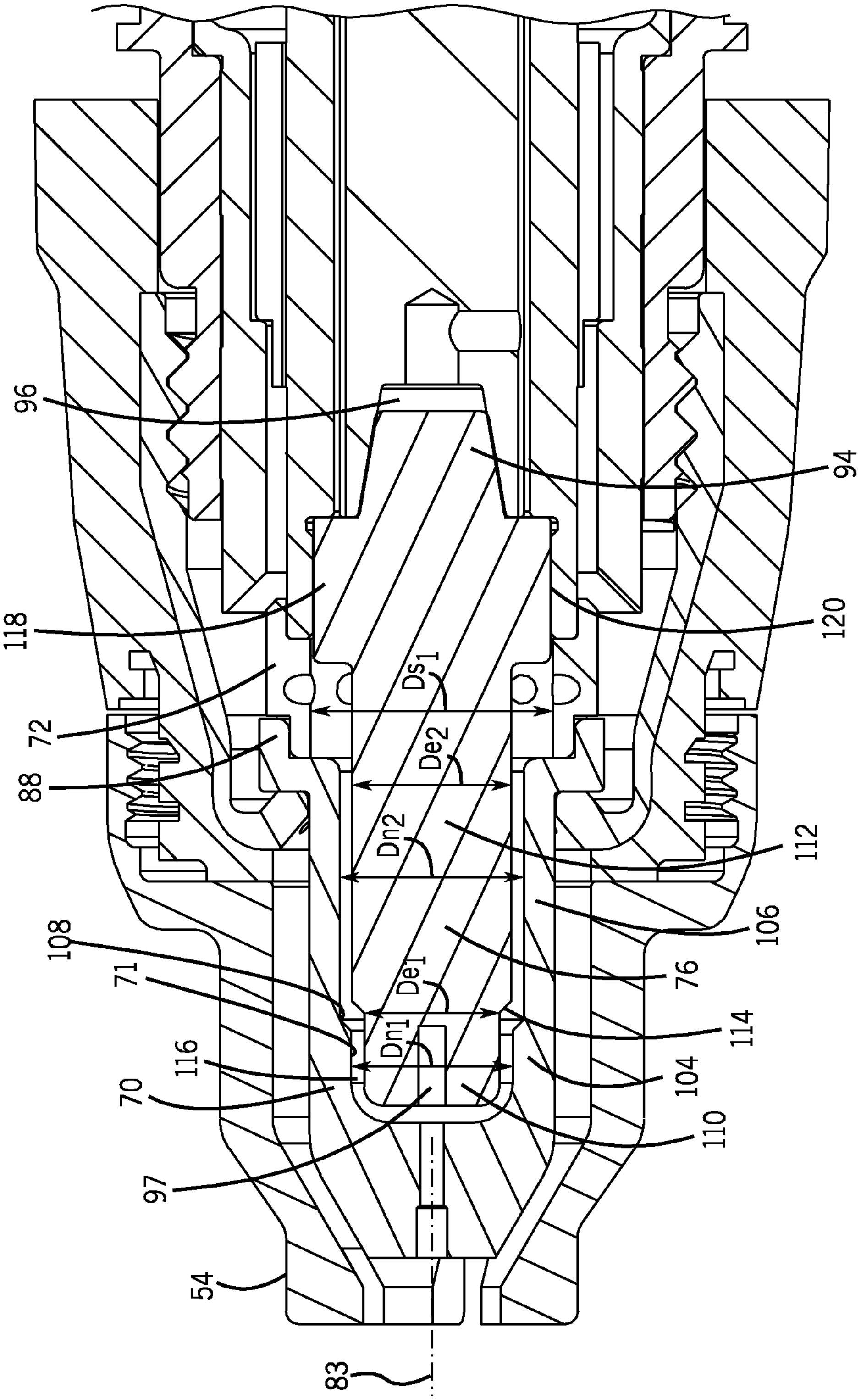
FIG. 6 depicts a close-up view of a cross-section of the torch taken along line 4-4 of FIG. 3 in accordance with an embodiment of the present invention.

FIG. 6 depicts a close-up view of the cross-section of the torch 14 taken along line 4-4 of FIG. 3 in accordance with an embodiment of the present invention. As shown in FIG. 6, the nozzle 70 may include an inner surface 71 and may include a first portion 104 having a first inner diameter $D_{n1}$ and second portion 106 having a larger (stepped) inner diameter $D_{n2}$. The first portion 104 having the first diameter $D_{n1}$ is closer to the exit portion 66 of the torch 14 and the second portion 106 of the nozzle 70 having the stepped diameter $D_{n2}$ is further from the exit portion 66. The first portion 104 and second portion 106 may be joined by an inner angled surface 108 that increases the diameter of the nozzle 70 from the first diameter $D_{n1}$ to the second diameter $D_{n2}$. Additionally, as mentioned above, the nozzle 70 has a shoulder end portion 88. Similarly, the electrode 76 includes a first portion 110 having a first diameter $D_{e1}$ and a second portion 112 having a larger (stepped) diameter $D_{e2}$. The first portion 110 of the electrode 76 may be closer to the torch exit portion 66 and the arc emission point as compared to the second portion 112. The first portion 110 and the second portion 112 of the electrode 76 may be joined by an angled surface 114 that increases the diameter of the electrode 76 from the first diameter $D_{e1}$ to the second $D_{e2}$.

The inner wall 71 of the nozzle 70 and the electrode 76 may define a plasma arc chamber 116. As shown in FIG. 6, the profile of the nozzle 70 matches the profile of the electrode 76. That is, the inner wall 71 of the nozzle 70, and the first portion 104 and second portion 106, have the same profile along the longitudinal axis 83 of the torch 14 as the first portion 110 and second portion 112 of the electrode 76. The nozzle 70 includes a stepped inner diameter $D_{n2}$ that increases in a similar manner to the stepped diameter $D_{e2}$ of the electrode 76. In some embodiments, the ratio of the inner diameters $D_{n1}/D_{n2}$ of the nozzle 70 may be equal to the ratio of the diameters $D_{e1}/D_{e2}$ of the electrode 76. The matched profiles between the nozzle 70 and the electrode 76, and the geometry of the plasma arc chamber 116 defined by the inner wall 71 and the electrode 76, may provide for optimal cutting arc performance during operation of the torch 14.

Additionally, the second portion 112 of the electrode 76 may be disposed slightly aft of the plasma arc emission point to provide for increased cooling of the electrode 76. Specifically, the increased diameter $D_{e2}$ of the second portion 112 increases the surface area of the electrode aft of the plasma arc emission point and provides for increased electrode cooling through this increased surface area.

Additionally various features of the torch 14 aid in reducing or eliminating any impedance to movement of the electrode 76 during the contact start sequence described above. In some embodiments, for example, the clearance between the swirl ring 72 and the electrode 76 may be increased by reducing the inner diameter $D_{s1}$ of the swirl ring 72. Additionally, as shown in FIG. 6, the swirl ring 72 does not provide any concentric alignment and centering for the electrode 76 with respect to the axis 83 of the torch 14. Additionally, the swirl ring 72 does not provide any guidance for the electrode 76 during movement of the electrode 76 during the contact start sequence. By removing these interactions between the electrode 76 and the swirl ring 72, unimpeded movement of the electrode 76 is optimized and any impedance to such movement from the swirl ring 72 is reduced or eliminated.

Additionally, the electrode 76 may include various features to facilitate unimpeded movement of the electrode 76, as well as to provide for easier installation and removal of the electrode 76. As seen in FIG. 6, the electrode 76 includes a shoulder 118 that is received by an annular recess 120 in the cathode member. The engagement between the shoulder 118 and the annular recess 120 provides for centering and concentricity of the electrode 76 with respect to the central longitudinal axis 83 of the torch 14. Both the shoulder 118 and the recess 120 are machined into metallic materials. For example, the electrode 76 may be formed from copper and the shoulder 118 may be machined into the copper of the electrode 76. The cathode body 78 may be formed from brass, and the annular recess 120 may be machined into the brass of the cathode body 78. Further, the electrode 76 or the cathode body 78 may be plated to provide a higher surface hardness and lower coefficient of friction. By machining the shoulder 118 and the annular recess 120 into metallic materials, the shoulder 118 and the annular recess 120 may be machined to relatively small tolerances, i.e., the smallest tolerances achievable by the equipment used to machine the shoulder 118 and the annular recess 120. Additionally, the metallic materials provide for improved stability in the radial and axial direction when the electrode 76 is installed in the torch 14. The small tolerances and metallic materials provide for low friction between the shoulder 118 and annular recess 120 to facilitate smooth movement of the electrode 76 and reduce or eliminate impedance to such movement. Moreover, during removal of the electrode 76, the small tolerances and low friction between the shoulder 118 and the annular recess 120 may aid in self-release of the electrode 76 after the thermal cycles experienced during operation of the torch 14.

As also mentioned above, the electrode 76 includes a frustoconical portion 94 that is received by the recess 96. The frustoconical portion 94 may be machined into the copper of the electrode 76. Similarly, the plunger 60 may be formed from brass and the recess 96 may be machined into the brass of the plunger 60. Here again, by machining the frustoconical portion 94 and the recess 96 into metallic materials, the frustoconical portion 94 and the recess 96 may be machined to relatively small tolerances, i.e., the smallest tolerances achievable by the equipment used to machine the shoulder 118 and the annular recess 120.

Additionally, the frustoconical portion 94 and the recess 96 machined to relatively small tolerances may provide for as much electrical and thermal transfer surface area between the electrode 76 and the plunger 60 as possible. Moreover, as described more below, the profile of the frustoconical portion 94 minimizes loss of the electrical and thermal contact due to foreign debris and dirt between the electrode 76 and the plunger 60. For example, any foreign debris and dirt between the frustoconical portion 94 and the recess 96 will not prevent electrical and thermal contact at other portions of the frustoconical portion 94 and recess 96. In such cases, for example, the frustoconical portion 96 of the electrode 76 and the recess 94 may form a ring contact at one or more points along the length of the frustoconical portion 94, regardless of the gaps caused by foreign debris and dirt at other points of the along the length of the frustoconical portion 94.

Additionally, as described further below in FIGS. 6 and 7, the frustoconical portion 94 of the electrode 76 may form a self-releasing angle contact between the electrode 76 and plunger 60. As used herein, the term "self-releasing" refers to the release of the electrode 76 without any substantial operator-initiated forces or the use of tools. In such embodiments, the electrode 76 may be released from the torch 14, with little or zero application of additional force from the operator to cause the electrode to release. Thus, the electrode 76 may simply be removed from the torch 14 with a minimal to zero resistance. Additionally, the self-releasing capability may be improved by the small tolerances achieved in formation of the electrode 76 and the plunger 60. Here again, the low friction between the frustoconical portion 94 and the recess 96 may provide for unimpeded movement of the electrode and reduce or eliminate any impedance to such movement. Thus, the angle contact may provide for easier and toolless removal of the electrode 76 from the torch 14. Similarly, when installing the electrode 76, the angle contact may provide for easier and toolless installation of the electrode 76.

Figure 7:
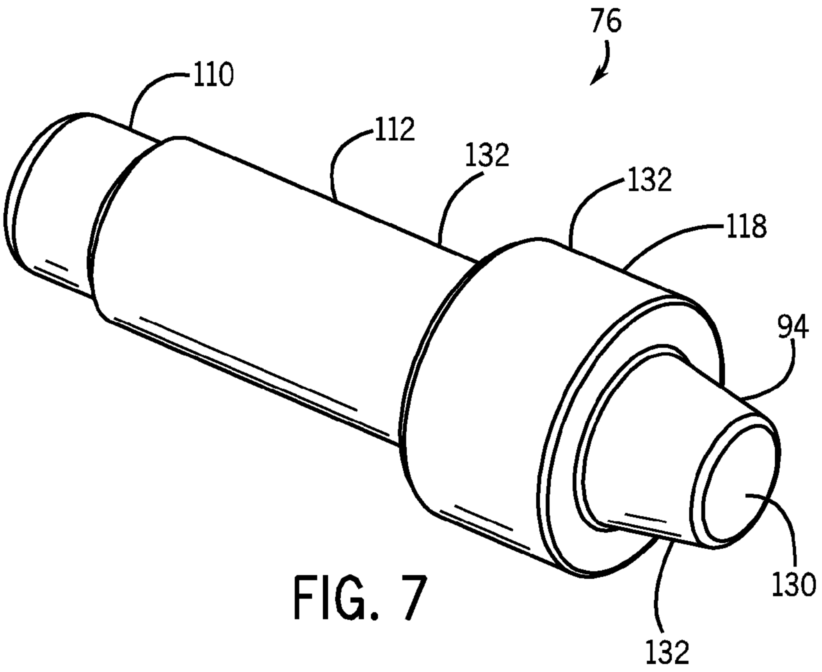
FIG. 7 is a perspective view of an electrode of a plasma torch having a frustoconical end portion in accordance with an embodiment of the present invention.

FIGS. 7-12 described below depict the above-described components of the torch 14 in further detail. Turning to the electrode 76, FIG. 7 is a perspective view of the electrode 76 in accordance with an embodiment of the present invention. As discussed above, the electrode 76 may include a first portion 110 having a first diameter $D_{e1}$. This first portion 110 may also be referred to as the "tip" of the electrode 76 and may include the hafnium insert 97. Additionally, as also mentioned above, the electrode 76 includes a second portion 112 having a stepped diameter $D_{e2}$, a shoulder portion 118, and a frustoconical end portion 94. As shown in FIG. 7, the frustoconical end portion 94 includes a flat end face 130. Additionally, the surface 132 of the electrode 76 may be a continuous smooth surface without any structural features on the surface 132, i.e., the surface 132 may be machined smooth to the smallest tolerances achievable by the machining equipment. Without such structural surface features, the electrode 76 may therefore be less susceptible to damage that may impede operation of the torch 14. Moreover, the electrode 76 may be easier to manufacture without the formation of such structural surface features.

Figure 8:
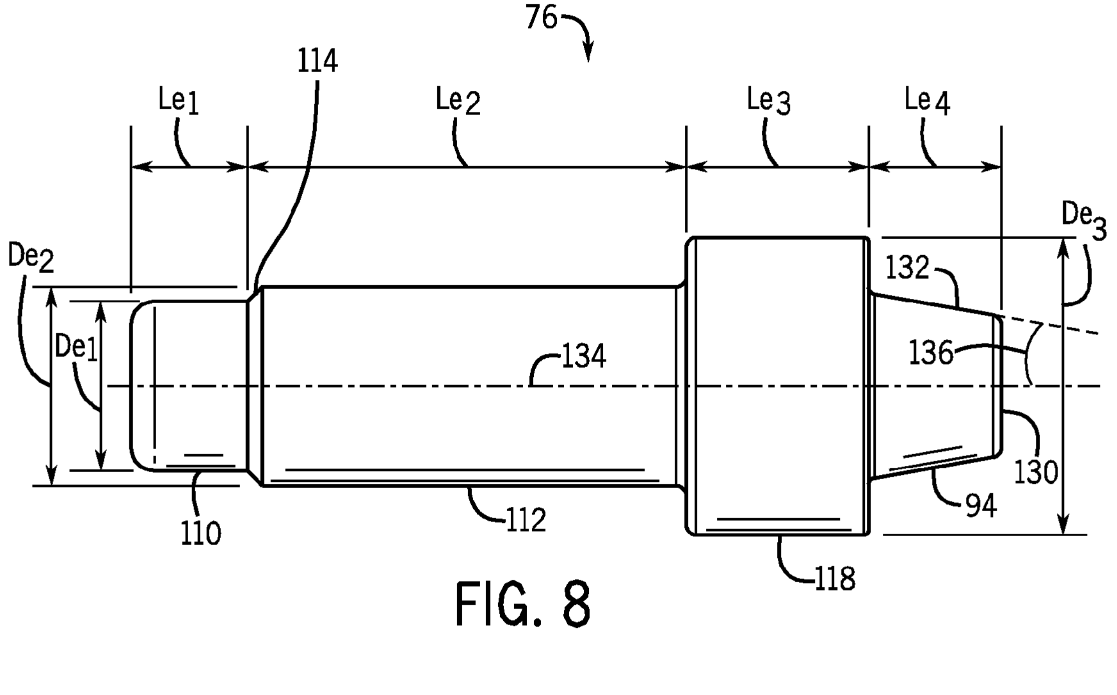
FIG. 8 is a side view of the electrode of FIG. 7 in accordance with an embodiment of the present invention.

FIG. 8 is a side view of the electrode 76 in accordance with an embodiment of the present invention. As shown in FIG. 8, the electrode 76 includes the first portion 110 having a diameter $D_{e1}$ and a length $L_{e1}$, a second portion 112 having a diameter $D_{e2}$ and a length $L_{e2}$, a should portion 118 having a diameter $D_{e3}$ and a length $L_{e3}$, and a frustoconical portion 94 having a length $L_{e4}$. The electrode 76 may have a central longitudinal axis 134. As mentioned above, when installed in the torch 14, the electrode 76 may be concentrically aligned and centered in the torch 14 through engagement of the shoulder portion 118 with the annular recess 120, such that the central longitudinal axis 134 is aligned with the central longitudinal axis 83 of the torch 14. The frustoconical portion 94 may include an angled surface 132 that gradually tapers from shoulder portion 118 to the end face 130.

In some embodiments, the angled surface 132 of the frustoconical portion 94 may be defined with reference to the central longitudinal axis 134 of the electrode 76. For example, the angled surface 132 may be formed at an angle 136. As stated above, the angle 136 may be selected to ensure that movement of the electrode 76 into and out of the recess 96 is unimpeded. Such an angle may enable the electrode 76 to be self-releasing and toollessly removed from the torch 14, thus providing for easier replacement of the electrode 76.

FIG. 9 depicts a perspective view of the swirl ring 72 in accordance with an embodiment of the present invention. The swirl ring 72 may include a plurality of holes 138 circumferentially disposed around the swirl ring 72. The holes may direct gas to the electrode and forward to the plasma chamber for ionization into plasma. As shown in FIG. 9, the swirl ring 76 may include a first portion 140 having a first outer diameter and a second portion 142 having a second outer diameter. Moreover, the second portion 142 may include an inner annular recess 144 for engaging the cathode body 78.

FIG. 10 depicts a side view of the swirl ring 72 in accordance with an embodiment of the present invention. The swirl ring 72 may be formed from plastic or other non-conductive materials. The swirl ring 72 includes the first portion 140 having a first outer diameter $D_{s2}$ and a length $L_{s1}$, and a second portion having a second outer diameter $D_{s3}$ and a length $L_{s2}$. Additionally, as noted above, the swirl ring 72 may include an inner diameter $D_{s1}$. The swirl ring 72 also has a central longitudinal axis 145. As shown above in FIG. 6, when installed in the torch 14, the first portion 140 of the swirl ring 72 may engage the shoulder portion of the nozzle 70 and the second portion 142 of the swirl ring 72 may engage the cathode body 78. When engaged with the nozzle 88 and the cathode body 78 in this manner, the swirl ring 72 may be concentrically aligned and centered with the torch 14 such that the central longitudinal axis 145 of the swirl ring 72 aligns with central longitudinal axis 83 of the torch 14.

Advantageously, the swirl ring 72 may be relatively small, thus reducing the material used and the manufacturing costs. Moreover, the design of the swirl ring 72, specifically the ratio of $L_{s2}$ to $D_{s1}$ being relatively small, may be less prone to distortion if the retaining cup 56 is overtightened. For example, in certain embodiments, the ratio of $L_{s2}$ to $D_{s1}$ may be less than approximately 0.7, approximately 0.6, approximately 0.5, or approximately 0.4. For further example, in one embodiment, the ratio of $L_{s2}$ to $D_{s1}$ may be between approximately 0.45 and approximately 0.5. Finally, the clearance between the swirl ring 72 and the electrode 76, such as defined by the ratio between the inner diameter $D_{s1}$ of the swirl ring and the second diameter $D_{e2}$ of the electrode 76, may provide a relatively larger clearance between the electrode 76 and the swirl ring 72 to minimize or eliminate any impedance to movement of the electrode 76.

Figure 11:
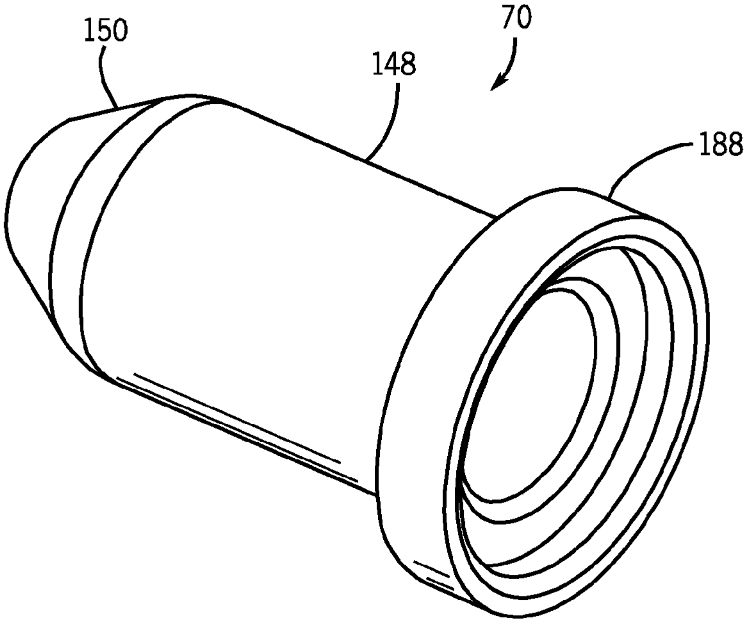
FIG. 11 is a perspective view of a nozzle of a plasma torch in accordance with an embodiment of the present invention.

FIG. 11 is a perspective view of the nozzle 70 in accordance with an embodiment of the present invention. The nozzle 70 may include a first portion 148 having a frustoconical tip 150 and a shoulder end portion 88 as described above. As mentioned above, the shoulder end portion 88 may engage and be retained by the inner facing lip 90 of the retaining cup 56. The nozzle 70 may be formed from copper or other metallic or conductive materials.

Figure 12:
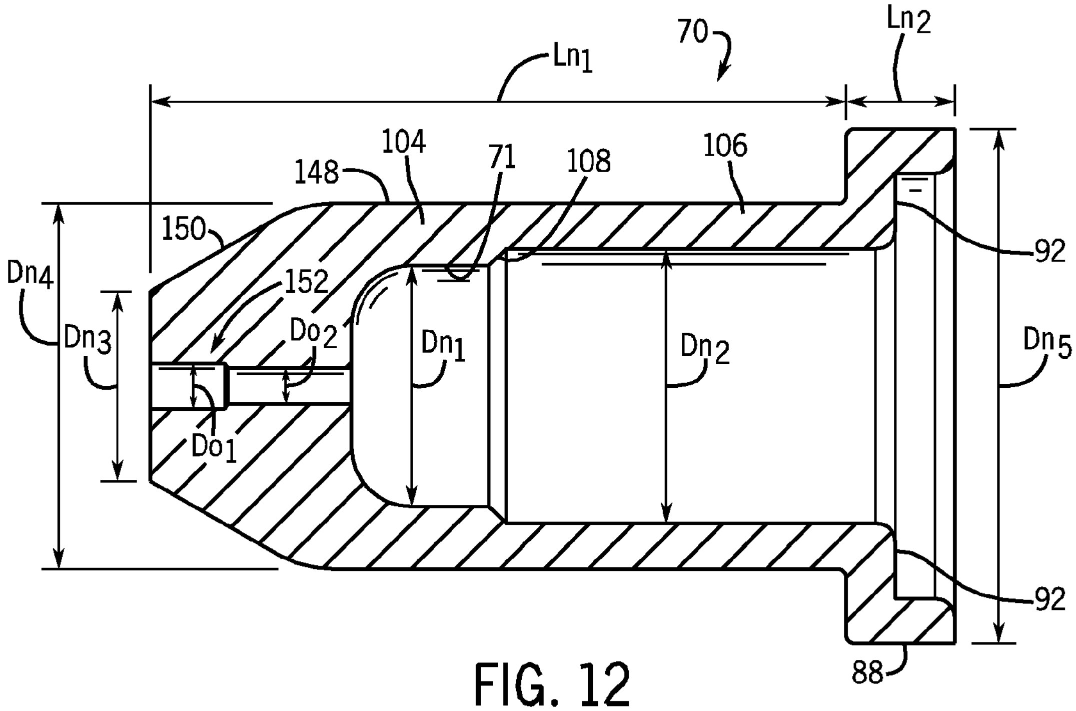
FIG. 12 is a side view of the nozzle of FIG. 11 in accordance with an embodiment of the present invention.

FIG. 12 is a cross-section of the nozzle 70 in accordance with an embodiment of the present invention. As shown in FIG. 12, the nozzle 70 includes a first portion 148 having a length $L_{n1}$. The first portion 148 includes the frustoconical tip 150 that narrows to an outer diameter $D_{n3}$ from an outer diameter $D_{n4}$. The nozzle 70 also includes a shoulder portion 88 having an outer diameter $D_{n5}$. As mentioned above, the inner wall 71 of the nozzle 70 has the same profile as the electrode 76. That is, the inner wall 71 of the nozzle includes the inner angled surface 108 that increases the diameter of the nozzle 70 from the first diameter $D_{n1}$ to the second diameter $D_{n2}$. The inner angled surface 108 and the transition from the first diameter $D_{n1}$ to the second diameter $D_{n2}$ matches the outer angled surface 114 of the electrode 76 and the transition from the first portion 110 of the electrode 76 to the second portion 112 of the electrode 76. As noted above, the matched profiles between the nozzle 70 and the electrode 76, and the geometry of the plasma arc chamber 116 defined by the inner wall 71 and the electrode 76, may provide for optimal cutting arc performance.

Additionally, as seen in FIG. 12, the nozzle 76 includes a stepped orifice 152. The orifice 152 includes a first portion 154 having an inner diameter Do1 and a second portion 156 having an inner diameter Do2, such that Do1 is larger than Do2. The stepped orifice 152 provides for flow of the ionized plasma gas from the plasma chamber to the tip 152 and out of the exit portion 66 of the torch 14.

Figure 13:
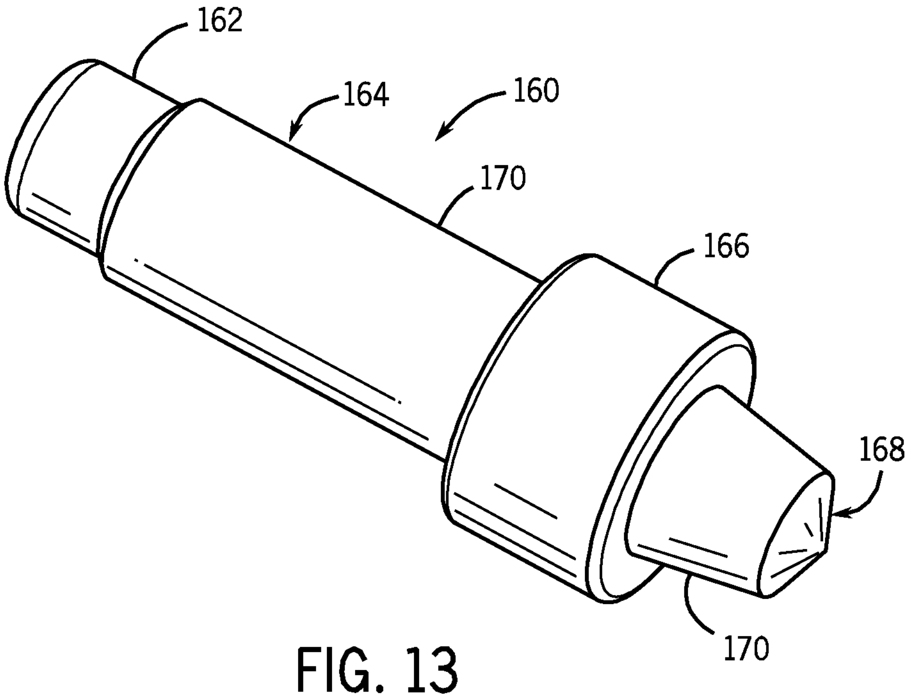
FIG. 13 is a perspective view of an electrode of a plasma torch having a conical end portion in accordance with an embodiment of the present invention.

FIG. 13 is a perspective view of an electrode 160 in accordance with another embodiment of the present invention. Similar to the electrode 76 discussed above, the electrode 160 may include a first portion 162, which may be referred to as the "tip" of the electrode 160. The electrode 160 also includes a second portion 164 having a stepped diameter, a shoulder portion 166, and a conically shaped end portion 168. That is, as compared to the embodiment of the electrode 76 illustrated in FIG. 7, the embodiment of the electrode 160 illustrated in FIG. 13 includes conically shaped portion 168. As such, it should be noted that presently contemplated electrodes compatible with the disclosed plasma cutting torches may take on a variety of suitable shapes, such as a variety of conical-like shapes, which may include frustoconical shapes (e.g., as in the embodiment of FIG. 7) and conical shapes (e.g., as in the embodiment of FIG. 13), among other conical-like shapes.

As with the electrode 76 of FIG. 7, a surface 170 of the electrode 160 may be a continuous smooth surface without any structural features on the surface 170, i.e., the surface 170 may be machined smooth to the smallest tolerances achievable by the machining equipment. Without such structural surface features, the electrode 160 may therefore be less susceptible to damage that may impede operation of the torch 14 and may be easier to manufacture without the formation of such structural surface features.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A plasma torch, comprising:

a nozzle comprising an inner wall having a first profile; and a moveable electrode comprising a shoulder, a conical portion, and an outer surface having a second profile, the shoulder being closer to a tip of the plasma torch than the conical portion and larger in diameter than a maximum diameter of the conical portion, wherein the moveable electrode is biased to a first position closer to the tip of the torch when the torch is non-operational and moved to a second position further from the tip when the torch is operational;

wherein the outer surface of the electrode and the inner wall of the nozzle define a plasma arc chamber, and wherein the conical portion of the moveable electrode is configured to provide an electrical connection between the moveable electrode and a plunger of the plasma torch.

2. The plasma torch of claim 1, wherein the first profile comprises a first portion having a first diameter and a second portion having a second diameter, wherein the second diameter is larger than the first diameter and the first portion and second portion are joined by an angled inner surface of the inner wall.

3. The plasma torch of claim 2, wherein the second profile comprises a first portion of the moveable electrode having a first diameter and a second portion of the moveable electrode having a second diameter, wherein the second diameter is larger than the first diameter and the first portion and second portion are joined by an angled outer surface of the electrode.

4. The plasma torch of claim 3, comprising a moveable plunger configured to receive a portion of the electrode, wherein the moveable plunger is biased to a first position closer to the tip of the torch when the torch is non-operational and moved to a second position further from the tip when the torch is operational.

5. The plasma torch of claim 4, comprising a spring configured to bias the plunger to the first position.

6. The plasma torch of claim 1, comprising a cathodic element disposed around the moveable plunger and comprises an annular recess.

7. The plasma torch of claim 6, wherein the electrode comprises a shoulder portion received in the annular recess of the cathodic element.

8. The plasma torch of claim 7, wherein the electrode comprises a frustum portion adjacent to the conical portion.

9. The plasma torch of claim 1, wherein the surface of the electrode is machined substantially smooth.

10. An electrode, comprising:

a first portion having a first diameter;

a second portion adjacent to the first portion and having a second diameter, wherein the second diameter is larger than the first diameter;

a shoulder portion adjacent to the second portion and having a third diameter, wherein the third diameter is greater than the first diameter;

and a frustoconical portion adjacent to the shoulder portion, wherein a maximum diameter of the frustoconical portion is smaller than the third diameter, wherein the shoulder portion provides concentricity and centering with respect to an axis of a plasma torch, and the shoulder portion is closer to a tip of the plasma torch than the frustoconical portion when the electrode is installed in the plasma torch.

11. The electrode of claim 10, comprising a hafnium, tungsten, or zirconium insert disposed in the first portion.

12. The electrode of claim 11, wherein the electrode comprises copper, silver, aluminum, or a combination thereof.

13. The electrode of claim 10, wherein the surface of the electrode is machined substantially smooth and without any surface features.

14. A plasma torch comprising:

a nozzle;

a moveable electrode partially disposed in the nozzle, wherein the electrode comprises:

a shoulder portion engaged with a cathode body comprising a first diameter, wherein the shoulder portion provides concentricity and centering with respect to an axis of a plasma torch; and a conical-like portion adjacent to the shoulder portion comprising a maximum diameter smaller than the first diameter, wherein the shoulder portion is closer to a tip of the plasma torch than the conical-like portion; and a moveable plunger configured to receive the moveable electrode, wherein the moveable plunger comprises a recess configured to receive the conical-like portion of the moveable electrode, wherein the conical-like portion comprises a surface formed at a self-releasing angle such that the moveable electrode toollessly self-releases from the recess.

15. The plasma torch of claim 14, wherein the conical-like portion comprises a frustoconical portion.

16. The plasma torch of claim 14, wherein the conical-like portion comprises a conical portion.

17. The plasma torch of claim 16, comprising a swirl ring disposed concentrically around the axis of the plasma torch, wherein the swirl ring is toollessly removable from the plasma torch, wherein the electrode does not engage the swirl ring for concentricity and centering.

18. The plasma torch of claim 17, wherein a ratio of a length of a portion of the swirl ring that is configured to engage the cathode body to an inner diameter of the swirl ring is less than approximately 0.5.

19. The plasma torch of claim 16, comprising a retaining cup configured to retain the nozzle in the torch, wherein the retaining cup is toollessly removable from the plasma torch, wherein retaining cup comprises interior thread configured to couple to an outer member of the torch.

20. The plasma torch of claim 19, wherein the nozzle comprises a shoulder end portion configured to engage a curved lip of the retaining cup.

21. The plasma torch of claim 17, wherein the nozzle comprises a shoulder end portion configured to engage a curved lip of the retaining cup, and wherein the swirl ring is configured to be retained by the shoulder end portion of the nozzle.

22. The plasma torch of claim 17, wherein the nozzle comprises a frustoconical tip comprising an orifice for flow plasma gas from a plasma gas chamber formed by an inner wall of the nozzle and an outer surface of the electrode.

23. The plasma torch of claim 22, wherein the orifice comprises a first portion closer to the tip of the torch and comprising a second diameter and a second portion further from the tip of the torch and comprising a third diameter, wherein the first diameter is greater than the second diameter.

24. An electrode, comprising:

a frustoconical portion;

a shoulder portion adjacent to the frustoconical portion comprising a first diameter and configured to provide concentricity and centering with respect to an axis of a plasma torch when the electrode is installed in the plasma torch, and wherein a maximum diameter of the frustoconical portion is smaller than the first diameter; and an extension extending from the shoulder portion and configured to define a plasma arc chamber between the electrode and a nozzle of the plasma torch when the electrode is installed in the plasma torch, and wherein the shoulder portion is between the extension and the frustoconical portion.

25. The electrode of claim 24, wherein the extension comprises a first portion having a first diameter and a second portion having a second diameter larger than the first diameter.

26. The electrode of claim 25, wherein an angled surface is disposed between the first portion and the second portion, and wherein the angled surface, the second portion, or a combination thereof, is configured to facilitate electrode cooling when the electrode is installed in the plasma torch.

* * * * *